United States Patent Office 2,970,182
Patented Jan. 31, 1961

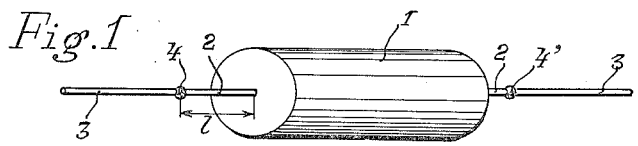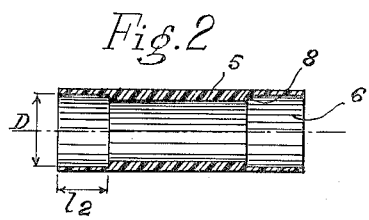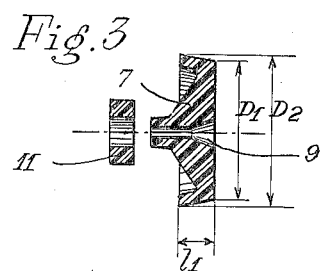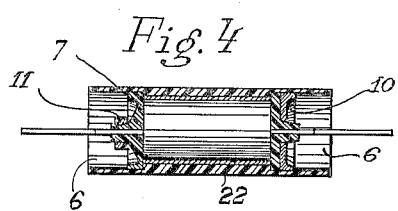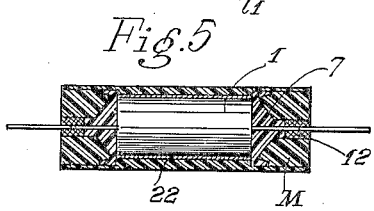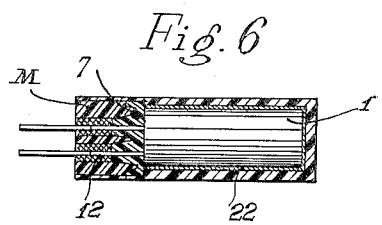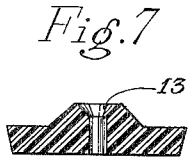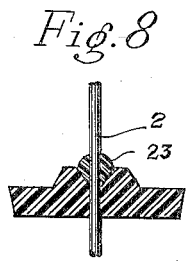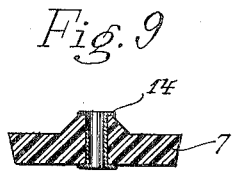

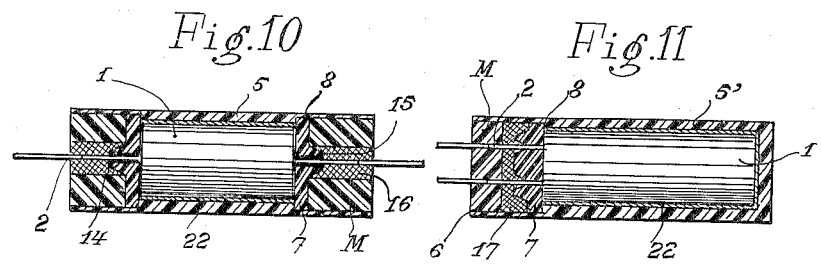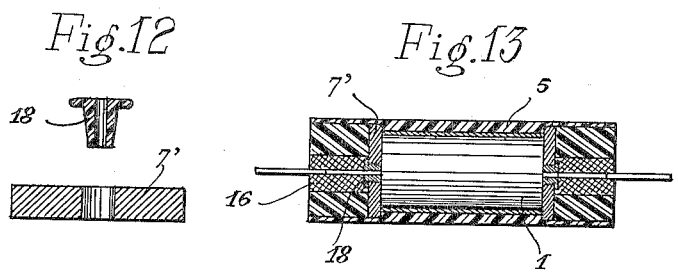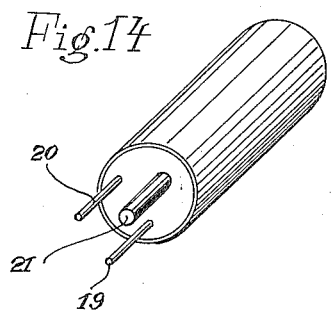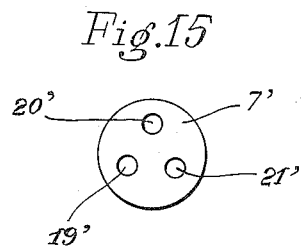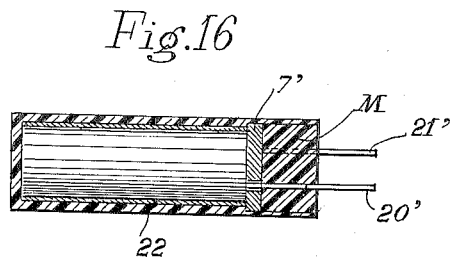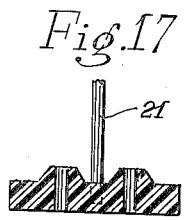

2,970,182

CASING FOR ELECTRONIC OR LIKE PARTS

Hermes Miquelis, 18 Rue du Congres,
Nice (Alpes-Maritimes), France

Filed Dec. 3, 1957, Ser. No. 700,378

Claims priority, application France Dec. 4, 1956

14 Claims. (Cl. 174—52)

The present invention relates to a tight and insulating casing or enclosure made of a plastic for electronic spare parts of the type employed for the manufacture of appliances used for electrotechnical purposes, for radio-electricity, for television, for electronics, etc. . . . and more particularly for condensers.

It is known to enclose or shroud electronic spare parts by means of plastics which are cast or molded under compression. This known process has two major disadvantages. The first one is that as the casting under compression is performed, a mechanical distortion of the part to be encased and an alteration of its characteristics may happen. The other disadvantage is that due to the preliminary heating which is necessary for casting, a reduction of the qualities of the part to be encased may take place as well as an evolution of vapors where the part contains a vaporizable material, said vapors being then condensed upon the output terminals and preventing a perfect sealing effect.

An object of the invention is to obviate the aforesaid disadvantages while permitting the use of any thermoplastic materials such as polyamides or superpolyamides for producing a perfectly tight casing of spare parts or elements as aforesaid such as condensers.

Another object of the invention is to provide a new or improved casing for electronic spare parts or the like comprising a cylindrical sheath or shell made of a plastic having a shape fitting the outline of the part to be encased, said sheath being opened at least at one of its ends to match the position of the output terminals of said part, said sheath being formed with an extension at least at one of its ends beyond the zone occupied by said part, a plug or stopper being inserted into said hollow extension, said plug being perforated for receiving the output connection or connections of said part, abutment elements limiting the extent of inward penetration of the plug so as to prevent said part from being distorted, and a mass of sealing plastic which fills the cavity defined by the sheath extension beyond the plug so as to imbed the output terminals, means being eventually provided for ensuring an increased sealing effect adjacent each output terminal.

A further object of the invention is to provide a casing as aforesaid comprising means for ensuring an intimate contact between the plug, the cylindrical sheath and each output terminal for rendering the casing perfectly tight or impervious prior to the injection of the sealing plastic.

With these and such other objects in view as will incidentally appear hereafter, the invention comprises the novel construction and combination of parts that will be now described with reference to the accompanying diagrammatic drawings exemplifying the same and forming a part of the present disclosure.

In the drawings:

Figure 1 is a perspective view of an electronic spare part capable of being provided with a plastic casing according to the invention.

Figure 2 is a longitudinal view of the plastic sheath forming part of the casing.

Figure 3 is a longitudinal sectional view of the plug or stopper.

Figure 4 is a longitudinal sectional view of a sheath containing a spare part and the plugs as well as the abutment washers.

Figure 5 is a longitudinal sectional view of a spare part housed in its casing.

Figure 6 is a similar view showing a spare part encased according to the invention, the output connections of which are provided on one side only.

Figure 7 is a sectional view of a modified form of the plug.

Figure 8 is a view showing how a connecting lead is fixed to the plug.

Figure 9 is a view showing another modified form of the plug.

Figure 10 is a longitudinal sectional view of a casing for an electronic spare part having connections on both sides.

Figure 11 is a similar view in the case of a part having connections on one side only.

Figure 12 is a view showing another modified form of the plug.

Figure 13 is a view illustrating a casing including this modified form of plug.

Figure 14 is a perspective view of an electronic spare part having output terminals and a securing and positioning pin.

Figure 15 is an end view of this spare part.

Figure 16 is a longitudinal sectional view of a casing utilizable for such a spare part.

Figure 17 is a sectional view drawn to a larger scale showing a modification of the plug utilizable for the part represented in Fig. 14.

The electronic spare part which requires to be encased and which is constituted for example by an electrolytic condenser 1 carries output terminals constituted by two-metal leads including an aluminium element 2 connected to an element 3 made of silvered or cadmium-plated copper, the connection being performed by welded or soldered points 4, 4' (Fig. 1).

The cylindrical sheath or shell of the casing which can be made of any thermoplastic material includes a central element 5 having a thicker wall defining the recess for the condenser 1 and at each end thinner extensions 6 which together with the central element 5 form abutment shoulders 8. In the present case, the sheath is open at both ends. As is visible in Fig. 4, the length of the element 5 matches the length of the part 1 and a plug or stopper 7 preferably made of a plastic material identical to the one of which the sheath is made can be inserted into each extension 6, said plug 7 resting against the shoulder 8. Such an abutment thus prevents distortion of the part when the casing elements are being assembled.

In the present embodiments, the plug 7 has an outer frustoconical shape, and the diameter $D_1$ of the inner face which rests against the shoulder 8 is slightly smaller or equal to the inner diameter D of the extensions 6 while the diameter $D_2$ of the wider portion of the plug is very slightly larger than the diameter D so as to cause the plug to penetrate with a forced fit into the extension 6 whose thin wall possesses a certain amount of elasticity. Each plug 7 has a hole 9 for the corresponding output terminal. The diameter of the hole 9 may be so calculated as to ensure a forced fit with the connecting wire also. Contact between the hole 9 and the connectiong lead element 2 may be further improved by engaging a clamping ring 11 (Fig. 3) on a rear boss on the plug. As is visible in the right hand side of Fig. 4, said contact may be also improved by engaging a metal washer 10 on said boss, the inner periphery of said washer being adapted to tighten the plug upon the connecting wire while its outer periphery applies the outer flange of the plug against said extension 6.

The axial length $l_1$ of the plug or stopper 7 is shorter than the length $l$ of the aluminium wire 2 carried by the part 1, and the length $l_2$ of the extension 6 of the sheath is larger than said length $l$. Therefore the welded point 4 is inside the recess formed by the extension 6.

In order to fit the condenser into its casing, the aluminium wire 2 is welded to the copper wire 3 and is afterwards welded to the condenser armatures. The coiled condenser 1 is then as shown by Fig. 1 and is then introduced into the recess 5 constituted by the middle portion of the sheath, the connecting wires thus projecting out of said sheath at each end. A plug 7 is inserted into each extension 6 of the sheath, the connecting wire passing through the plug hole 9 which then rests upon the shoulder 8. The assembly is then inserted into a mold, and a plastic material M which is identical or similar to the one of which the sheath 5 is made (Fig. 5) is then injected into the recesses defined by the extensions 6. During the injection thus effected, there may be provided around each output connection an annular recess 12 into which an epoxy resin for example may be cast. This permits an intimate contact to be obtained between the output connections and the plastic mass M and consequently a better sealing effect along said connections.

In the showing of Fig. 5, the washer 10 and the ring 11 are not provided but obviously this omission does not modify in the least the operative process. In the case shown by Fig. 4, the plastic material M is injected above the washer or ring.

The advantages of a plastic casing thus made are as follows: There is practically no or almost no appreciable heating due to the intimate contact between the plug, the sheath and the connections, and vapors which may evolve in the sheath cannot leak out and stain the surfaces adapted to come into intimate contact with the injected thermoplastic material while at the same time such material cannot penetrate as far as the condenser. The abutment shoulders of the sheath prevent the plugs from exerting a pressure on the condenser body. The injected plastic material is perfectly coalesced to the inner faces of the extensions 6. The terminal welded points are embedded in the injected material and are thus protected against mechanical distortions and corrosions. The provision of a casing made of an epoxy resin about the connections ensures an intimate contact with the injected plastic and prevents any emission of vapor. A one-piece and perfectly tight casing is thus obtained.

In the showing of Fig. 6 is illustrated a constructional form in which all output terminals are on the same side of the condenser, the sheath being then stopped at one end.

The plug shown in Fig. 7 has an outwardly directed flared portion 13. After positioning the plug into the sheath, a temporary seal may be obtained before injecting the sealing plastic material by casting into said flared portion 13 around the connecting wire a bead 23, as shown in Fig. 8, which is made of an epoxy resin or another adhesive.

According to a conceivable modification, there may be also imbedded in the plug 7 a hollow metal rivet or a sleeve 14 (Fig. 9) for the connecting wire. When preparing the casing, the connecting wires are then introduced through the sleeves 14 as shown in Fig. 10 and are welded to the sleeves as figured at 15 prior to the injection of the sealing plastic M. During said injection, there is provided about the connecting wires annular recesses 16 into which an epoxy resin or any other suitable adhesive is afterwards cast.

In the showing of Fig. 11 the invention is shown as applied to a condenser whose output terminals are all located on the same side. The production of the casing is effected as previously described. After the plug 7 has been inserted into position, there is cast into the bottom portion of the residual recess a layer 17 of an epoxy resin or another adhesive, whereafter the plastic material M is injected.

The plugs 7 used according to the aforesaid embodiments of the invention may be made of any suitable plastic material, steatite or other insulating material which may or not be covered with a synthetic or natural rubber. But the possibility also exists for the formation of the plugs to use metal washers 7' (Fig. 12) having one or several holes for the output terminals. In this case, there is advantageously introduced into the hole in the washer 7', after having threaded the same on the connecting wire, an insulating tubular gasket 18 made of rubber or plastic. Preferably this gasket is of frustoconical shape for tightly clamping the connecting wire as it is forced into the hole in the washer 7'. The casing which is thus obtainable is as shown in Fig. 13.

Where it is desirable to provide the electronic part with one or several pins for securing or positioning purposes, as is the case according to the showing of Fig. 14 in which the condenser carries output connections or terminals 19, 20 and a securing pin 21, the latter may be fixed to the plug itself, for example by being imbedded in its mass (Fig. 17) where it is made of a plastic material or alternatively by being welded or riveted in a corresponding hole where it is constituted (as shown in Fig. 16) by a metal washer 7' carrying the securing pin 21' and through which the output terminals 19', 20' pass. The pin 21' and the output terminals are of course imbedded into the mass of sealing plastic material M.

In all constructional forms, an advantage will be gained by providing inside the portion of the sheath receiving the electronic part a metal sleeve surrounding said part as shown at 22 so as to build an electrostatic housing for the part while enhancing the mechanical resistance of the assembly. In such a case, the sleeve ought to have a length equal to that of the part of the sheath which receives the part. If desired, said sheath might have a uniform thickness, the ends of the sleeve 22 forming abutments for the plugs.

Other constructional modifications are conceivable within the field of technical equivalencies without departing from the scope of the subjoined claims.

What is claimed is:

1. A casing for an electrolytic condenser element having terminal means extending therefrom, comprising a sheath of thermoplastic material having at least one open end, the portion of the sheath adjacent the open end extending beyond the element and having at least one of the terminal means extending therethrough, said portion of the sheath being of reduced thickness to provide an internal peripheral shoulder at the junction of said portion and the adjacent portion of the sheath, closure plug means of the same thermoplastic material as the sheath, said plug means having a diameter greater than the interior diameter of said portion of the sheath and having a thickness less than the length of the portion of the sheath of reduced thickness and being tightly fitted within said portion while bearing against said shoulder, said plug means being provided with at least one tightly fitted opening for passage of the terminal means therethrough, said open end of the sheath exteriorly of the plug means defining a recess, and an injected mass of the same thermoplastic material as the sheath and plug means in said recess exteriorly of the plug means welded to the sheath and plug means to form a one-piece casing and embedding the terminal means.

2. A casing according to claim 1 in which one end of the casing is closed and the other end is open.

3. A casing according to claim 1 in which the sheath has two open ends closed by plugs and masses of thermoplastic material of the same composition as the sheath and plugs welded thereto.

4. A casing according to claim 1 in which the thermoplastic material of the sheath, the plug means, and the injected mass is selected from the group consisting of a polyamide and a superpolyamide.

5. A method of encasing an electronic part having terminals comprising the steps of forming a plastic sheath member with at least one end open, said plastic sheath member having a first portion matching the outline of the part to be encased and at least one hollow end portion extending beyond said first portion and having reduced thickness to provide an internal peripheral shoulder, inserting said part into said first portion with said terminals extending through said open end, inserting a tightly fitted plug into said hollow end portion to bear against said shoulder to prevent distortion of said part and forming a recess exteriorly of said plug, said plug having a surface with a diameter greater than that of said hollow end portion, a thickness less than the length of said hollow end portion and tightly fitted openings for the terminals, and introducing into said recess plastic material thereby coalescing the plastic sheath member, plug and plastic material encasing the electronic part and embedding the terminals.

6. A method according to claim 5 in which one end of the plastic sheath member is closed and the other end is open.

7. A method according to claim 5 in which the plastic sheath member has two open ends closed by plugs and plastic material, both of the same composition as said plastic member.

8. A method according to claim 5 in which a further step comprises inserting a metal sleeve between said electronic part and said plastic sheath member.

9. A method according to claim 5 in which the plastic sheath member, plug and plastic material are selected from the group consisting of a polyamide and a superpolyamide.

10. A method according to claim 5 in which said plug has an outer frusto-conical shape such that the inner surface has a diameter less than the outer surface.

11. A method according to claim 10 in which the outer surface has a boss and a clamping ring engages said boss to further tighten said tightly fitted openings onto said terminal.

12. A method according to claim 5 in which the tightly fitted openings for the terminals have an outwardly directed flared portion in which a sealing medium is inserted before said plastic material is introduced.

13. A method of encasing an electronic part having terminals comprising the steps of forming a plastic sheath member with both ends open, said plastic sheath member having a first portion conforming to the outline of the part to be encased and with hollow end portions extending beyond said first portion and having reduced thickness to provide internal peripheral shoulders, inserting said part into said first portion with said terminals extending through the open ends, inserting tightly fitted plugs into said hollow end portions to bear against said shoulders to prevent distortion of said part and forming recesses exteriorly of said plugs, said plugs having outer flanges of frusto-conical shape, inner rear bosses of frusto-conical shape with tightly fitted openings therethrough for said terminals and of a thickness less than the length of said hollow end portions, placing washers on said bosses while the inner periphery of the washers further tightens the plugs upon the terminals while their outer periphery applies said outer flanges against said end portions, and introducing into said recesses plastic material thereby coalescing the plastic sheath member, plugs and plastic material encasing the electronic part and embedding the terminals.

14. A method according to claim 13 in which a further step comprises inserting a metal sleeve between said electronic part and said plastic sheath member.

References Cited in the file of this patent

UNITED STATES PATENTS

| 523,204 | Forest | July 17, 1894 |
| 1,763,115 | Wermine | June 10, 1930 |
| 2,779,813 | Collins | Jan. 29, 1957 |
| 2,829,426 | Franklin | Apr. 8, 1958 |
| 2,904,618 | Robinson et al. | Sept. 15, 1959 |

FOREIGN PATENTS

| 475,688 | Canada | July 31, 1951 |
| 527,911 | Canada | July 17, 1956 |

OTHER REFERENCES

"Du Pont Product Engineering Bulletin," No. 2, 1955, pp. 1–3.

Publication: "Hermetic Sealing of Capacitors," Proc. Inst. Elec. Engrs., vol. 97, part 3, January 1950, pages 56–64.